United States Patent
Hashimoto et al.

(10) Patent No.: US 11,034,272 B2
(45) Date of Patent: Jun. 15, 2021

(54) VEHICLE SEAT FRAME

(71) Applicant: TS TECH CO., LTD., Asaka (JP)

(72) Inventors: Norifumi Hashimoto, Tochigi (JP); Shintaro Mochizuki, Tochigi (JP); Mitsuru Sueki, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 16/838,248

(22) Filed: Apr. 2, 2020

(65) Prior Publication Data

US 2020/0247291 A1    Aug. 6, 2020

Related U.S. Application Data

(63) Continuation of application No. 15/746,288, filed as application No. PCT/JP2016/072216 on Jul. 28, 2016, now Pat. No. 10,611,280.

(30) Foreign Application Priority Data

Jul. 29, 2015    (JP) .................................. 2015-150056

(51) Int. Cl.
  *B60N 2/68*    (2006.01)
  *B21D 47/04*    (2006.01)
  (Continued)

(52) U.S. Cl.
  CPC ............... *B60N 2/68* (2013.01); *B21D 47/04* (2013.01); *B21D 53/88* (2013.01); *B60N 2/682* (2013.01); *B60R 21/207* (2013.01)

(58) Field of Classification Search
  CPC .................................. B60N 2/68; B60N 2/682
  See application file for complete search history.

(56) References Cited

U.S. PATENT DOCUMENTS 8,052,195 B2    11/2011    Aufere et al.
8,132,862 B2     3/2012    Yamada et al.
(Continued)

FOREIGN PATENT DOCUMENTS

JP    2007-313907 A    12/2007
JP    2011-042302 A     3/2011
(Continued)

OTHER PUBLICATIONS

Office Action issued in related application JP 2018-106270, dated Jul. 30, 2019, with machine generated English language translation, 6 pages.

*Primary Examiner* — Timothy J Brindley
(74) *Attorney, Agent, or Firm* — Faegre Drinker Biddle & Reath LLP

(57) ABSTRACT

Provided is a vehicle seat frame configured so that the weight of the frame can be reduced while the strength of a portion of the frame can be ensured. A vehicle seat frame F includes a frame member molded from a high tensile strength steel plate. A metal structure of a portion of the frame member is a structure formed according to one or more conditions upon a thermal treatment performed on the frame member, and the strength of the portion is different from those of other portions of the frame member. For example, the portion of the frame member includes a high strength portion with a higher strength than those of the other portions. Moreover, the portion of the frame member includes, for example, a low strength portion with a lower strength than those of the other portions.

16 Claims, 15 Drawing Sheets

(51) Int. Cl.
    *B21D 53/88*     (2006.01)
    *B60R 21/207*     (2006.01)

(56) References Cited

U.S. PATENT DOCUMENTS

| | | |
|---|---|---|
| 8,845,019 B2 | 9/2014 | Sawada |
| 9,096,152 B2 | 8/2015 | Zynda et al. |
| 9,162,595 B2 | 10/2015 | Seo et al. |
| 9,487,118 B2 | 11/2016 | Matsumoto et al. |
| 9,884,653 B2 | 2/2018 | Shimizu |
| 9,963,169 B2 | 5/2018 | Higuchi et al. |
| 9,994,927 B2 * | 6/2018 | Wines ..................... C22C 38/38 |
| 2004/0187981 A1 | 9/2004 | Ueda et al. |
| 2007/0001483 A1 | 1/2007 | Uchida et al. |
| 2011/0316320 A1 | 12/2011 | Kulkarni et al. |
| 2012/0037279 A1 | 2/2012 | Fujita et al. |
| 2012/0217775 A1 | 8/2012 | Fujita et al. |
| 2012/0273089 A1 | 11/2012 | Sakkinen et al. |
| 2013/0069415 A1 | 3/2013 | Yasuda et al. |
| 2013/0087257 A1 | 4/2013 | Yoshino et al. |
| 2015/0211085 A1 | 7/2015 | Harris et al. |
| 2016/0221485 A1 | 8/2016 | Harris et al. |
| 2016/0237519 A1 | 8/2016 | Wines et al. |
| 2016/0339821 A1 | 11/2016 | Akaike et al. |
| 2018/0334065 A1 | 11/2018 | Suzuki et al. |

FOREIGN PATENT DOCUMENTS

| | | |
|---|---|---|
| JP | 2011-252189 A | 12/2011 |
| JP | 5565785 B2 | 8/2014 |
| JP | 5657271 B2 | 1/2015 |

* cited by examiner

VEHICLE SEAT FRAME

CROSS REFERENCE TO RELATED APPLICATIONS

This application is a continuation application of U.S. patent application Ser. No. 15/746,288, filed Jan. 19, 2018, now U.S. Pat. No. 10,611,280, which is the National Stage Entry application of PCT Application No. PCT/JP2016/072216, filed Jul. 28, 2016, which claims the priority benefit of Japanese Patent Application No. JP 2015-150056, filed Jul. 29, 2015, the disclosures of which are incorporated herein by reference in their entirety.

BACKGROUND

The present disclosure relates to a vehicle seat frame, and particularly relates to a vehicle seat frame using a thin, lightweight material.

Weight reduction has been demanded for a vehicle seat frame (hereinafter referred to as a "seat frame") as a framework of a vehicle seat. However, even with weight reduction, the strength of the seat frame needs to be maintained and improved.

Thus, in a technique described in Japanese Patent Publication JP 5657271 B, thermal treatment by high-frequency quenching, liquid carburizing, or gas carburizing is performed for a frame member forming a seat frame molded using general steel or for the entirety of the seat frame, and in this manner, the strength of the seat frame molded using the general steel is improved.

Moreover, in a technique described in Japanese Patent Publication JP 5565785 B, thin steel has a reinforcement portion, and a high hardness portion is provided at the thin steel by thermal treatment. Further, in the technique described in Japanese Patent Publication JP 5565785 B, the shape of a force transmission path formed by the reinforcement portion and the high hardness portion is a substantially truss-like shape, and therefore, the strength of a seat frame is improved.

For further weight reduction, a high tensile strength steel plate as a thin lightweight material might be sometimes used for the frame member forming the seat frame. However, molding of the high tensile strength steel plate is more difficult than that of the general steel. In the case of using such a high tensile strength steel plate, when the thermal treatment is performed for the frame member requiring strength or the entirety of the seat frame as in the technique described in Japanese Patent Publication JP 5657271 B, there is a probability that great strain is caused due to the thermal treatment, leading to lower product accuracy. Moreover, in the case of providing the reinforcement portion at the thin steel as in the technique described in Japanese Patent Publication JP 5565785 B, a weight increases by the reinforcement portion, and therefore, there is a problem in weight reduction.

SUMMARY

The present disclosure has been made in view of the above-described problems, and various embodiments provide a vehicle seat frame configured so that the weight of the frame can be reduced while the strength of the frame can be partially adjusted.

The above-described problems are solved by an embodiment of a vehicle seat frame according to the present disclosure. The vehicle seat frame includes a frame member molded using a high tensile strength steel plate. A metal structure of a portion of the frame member is a structure formed according to one or more conditions upon a thermal treatment performed on the frame member, and the strength of the portion is different from those of other portions of the frame member.

In the above-described vehicle seat frame, the metal structure of the portion of the frame member molded from the high tensile strength steel plate is the structure formed according to the conditions upon the thermal treatment, and the strength of the portion is different from those of the other portions. With this configuration, in the above-described vehicle seat frame, the strength can be partially changed in the same frame member without changing a shape or a material. Thus, a thin lightweight material can be used for the frame member to realize weight reduction while the strength of the frame member can be partially adjusted.

In the above-described vehicle seat frame, the portion may include a high strength portion with a higher strength than those of the other portions. According to the above-described configuration, the strength of a portion subjected to the thermal treatment can be, in the vehicle seat frame, higher than that of a portion not subjected to the thermal treatment. That is, according to the above-described configuration, deformation of a portion of the frame member subjected to the thermal treatment under predetermined conditions can be suppressed.

In the above-described vehicle seat frame, the high strength portion may be a portion heated to a temperature equal to or higher than a predetermined temperature and then cooled at a cooling rate equal to or higher than a predetermined cooling rate to form the metal structure. According to the above-described configuration, the strength of the portion of the frame member quenched after heating under the predetermined conditions can be higher than those of the other portions. That is, according to the above-described configuration, the cooling rate for the portion of the frame member in the thermal treatment is controlled so that the portion having a high strength can be partially provided at the frame member.

In the above-described vehicle seat frame, a metal structure of the high strength portion may be martensite. According to the above-described configuration, the portion whose metal structure is a high hardness martensite can be partially provided at the frame member. With this configuration, the portion having a high strength can be partially provided at the frame member.

In the above-described vehicle seat frame, the high strength portion may be provided at at least one of i) the periphery of a welding portion between an upper frame and a side frame of a seat back frame, or ii) the periphery of a welding portion between a lower frame and the side frame of the seat back frame. According to the above-described configuration, stiffness can be enhanced at the periphery of the welding portion between the upper frame and the side frame of the seat back frame or the periphery of the welding portion between the lower frame and the side frame of the seat back frame, stress tending to concentrate on these peripheral portions upon vehicle collision. With this configuration, deformation of the vehicle seat frame can be suppressed.

In the above-described vehicle seat frame, the portion may include a low strength portion with a lower strength than those of the other portions. According to the above-described configuration, the portion having a low strength can be partially provided at the frame member without changing the shape or material of the frame member forming the vehicle seat frame. With this configuration, deformation of the portion of the frame member subjected to the thermal treatment under the predetermined conditions can be accelerated.

In the above-described vehicle seat frame, the low strength portion may be a portion heated to a temperature equal to or higher than the predetermined temperature and then cooled at a cooling rate lower than the predetermined cooling rate to form the metal structure. According to the above-described configuration, the strength of the portion included in the frame member forming the vehicle seat frame and slowly cooled after heating under the predetermined conditions can be lower than those of the other portions. As described above, the cooling rate for the frame member in the thermal treatment is controlled so that the portion having a low strength can be partially provided at the frame member.

In the above-described vehicle seat frame, a metal structure of the low strength portion may include pearlite. Note that pearlite is a generic term of a state in which ferrite and cementite coexist, and is a cementite layer with a ferrite base, for example. According to the above-described configuration, the portion whose metal structure includes a low hardness pearlite is partially provided at the frame member so that the portion having a low strength can be partially provided at the frame member.

In the above-described vehicle seat frame, the low strength portion may be provided at at least one of i) a connection portion between the seat back frame and a seat cushion frame, ii) a lower portion of the side frame forming the seat back frame, and iii) a back portion of a cushion side frame forming the seat cushion frame. Moreover, the above-described connection portion may be configured integrally with the cushion side frame. According to the above-described configuration, the low strength portion functions as a weak portion so that energy upon vehicle collision can be efficiently absorbed.

In the above-described vehicle seat frame, the thermal treatment may be performed with the frame member being assembled. According to the above-described configuration, the magnitude of strain caused due to the thermal treatment can be suppressed as compared to the case of performing the thermal treatment before the frame member being assembled.

In the above-described vehicle seat frame, the high strength portion may be provided along a connection portion between a seat side surface and a seat back surface at the side frame of the seat back frame. According to the above-described configuration, the strength of the seat back frame against force applied on a seat back side can be improved.

In the above-described vehicle seat frame, the side frame of the seat back frame may be provided with a plurality of holes for airbag attachment, and the high strength portion may be provided to extend in a seat front-to-back direction between the plurality of holes. According to the above-described configuration, the strength of the side frame of the seat back frame against force applied in the seat front-to-back direction can be improved. With this configuration, deformation of the side frame of the seat back frame can be suppressed.

In the above-described vehicle seat frame, the high strength portion may have a first region provided along the connection portion between the seat side surface and the seat back surface at the side frame of the seat back frame, and a plurality of second regions provided to extend in the seat front-to-back direction between the plurality of holes. According to the above-described configuration, the strength can be improved across a wide area of the seat side surface of the side frame of the seat back frame.

In the above-described vehicle seat frame, the high strength portion may be provided along or provided overlapping with at least one of i) the welding portion between the upper frame of the seat back frame and the side frame of the seat back frame, or ii) the welding portion between the lower frame of the seat back frame and the side frame of the seat back frame. According to the above-described configuration, the strength can be improved across a wide area of the side frame of the seat back frame in a seat upper-to-lower direction.

In the above-described vehicle seat frame, the high strength portion may be provided at a portion where the upper frame of the seat back frame and the side frame of the seat back frame overlap with each other. According to the above-described configuration, the strength of a joint portion between the upper frame and the side frame of the seat back frame can be improved.

According to the present disclosure, the weight of the vehicle seat frame can be reduced while the strength of a necessary portion of the vehicle seat frame can be ensured.

According to an embodiment of the present disclosure, deformation of the portion of the vehicle seat frame subjected to the thermal treatment under the predetermined conditions can be reduced.

According to an embodiment of the present disclosure, the cooling rate for the portion of the vehicle seat frame in the thermal treatment is controlled so that the portion having a high strength can be partially provided at the vehicle seat frame.

According to an embodiment of the present disclosure, the portion whose metal structure is the high hardness martensite is partially provided at the vehicle seat frame so that the portion having a high strength can be partially provided at the vehicle seat frame.

According to an embodiment of the present disclosure, the stiffness can be enhanced at the periphery of the welding portion between the upper frame and the side frame of the seat back frame or the periphery of the welding portion between the lower frame and the side frame of the seat back frame, the stress tending to concentrate on these peripheral portions upon vehicle collision. Thus, deformation of the vehicle seat frame can be suppressed.

According to an embodiment of the present disclosure, the portion having a low strength can be partially provided at the frame member without changing the shape or material of the frame member forming the vehicle seat frame.

According to an embodiment of the present disclosure, the cooling rate for the frame member in the thermal treatment is controlled so that the portion having a low strength can be partially provided at the frame member.

According to an embodiment of the present disclosure, the portion whose metal structure includes the low hardness pearlite is partially provided at the frame member so that the portion having a low strength can be partially provided at the frame member.

According to an embodiment of the present disclosure, the energy upon vehicle collision can be efficiently absorbed.

According to an embodiment of the present disclosure, the magnitude of strain caused due to the thermal treatment can be suppressed as compared to the case of performing the thermal treatment before assembly.

According to an embodiment of the present disclosure, the strength of the seat back frame against the force applied on the seat back side can be improved.

According to an embodiment of the present disclosure, the strength of the side frame of the seat back frame against the force applied in the seat front-to-back direction can be improved.

According to an embodiment of the present disclosure, the strength can be improved across the wide area of the seat side surface of the side frame of the seat back frame.

According to an embodiment of the present disclosure, the strength can be improved across the wide area of the side frame of the seat back frame in the seat upper-to-lower direction.

According to an embodiment of the present disclosure, the strength of the joint portion between the upper frame and the side frame of the seat back frame can be improved.

BRIEF DESCRIPTION OF DRAWINGS

Various embodiments of the invention are illustrated in the drawings, in which.

DETAILED DESCRIPTION

A vehicle seat and a seat frame as a framework of the vehicle seat according to an embodiment of the present disclosure is described below with reference to FIGS. 1 to 15.

The present embodiment relates to an invention of a vehicle seat frame including a frame member molded from a high tensile strength steel plate, where a metal structure of a portion of the frame member has a structure according to conditions upon thermal treatment and that the strength of the portion is different from those of other portions of the high tensile strength steel plate. Note that an occupant seating side with respect to a seat back of the vehicle seat is a seat front side, and an opposite side thereof is a seat back side.

Figure 1:
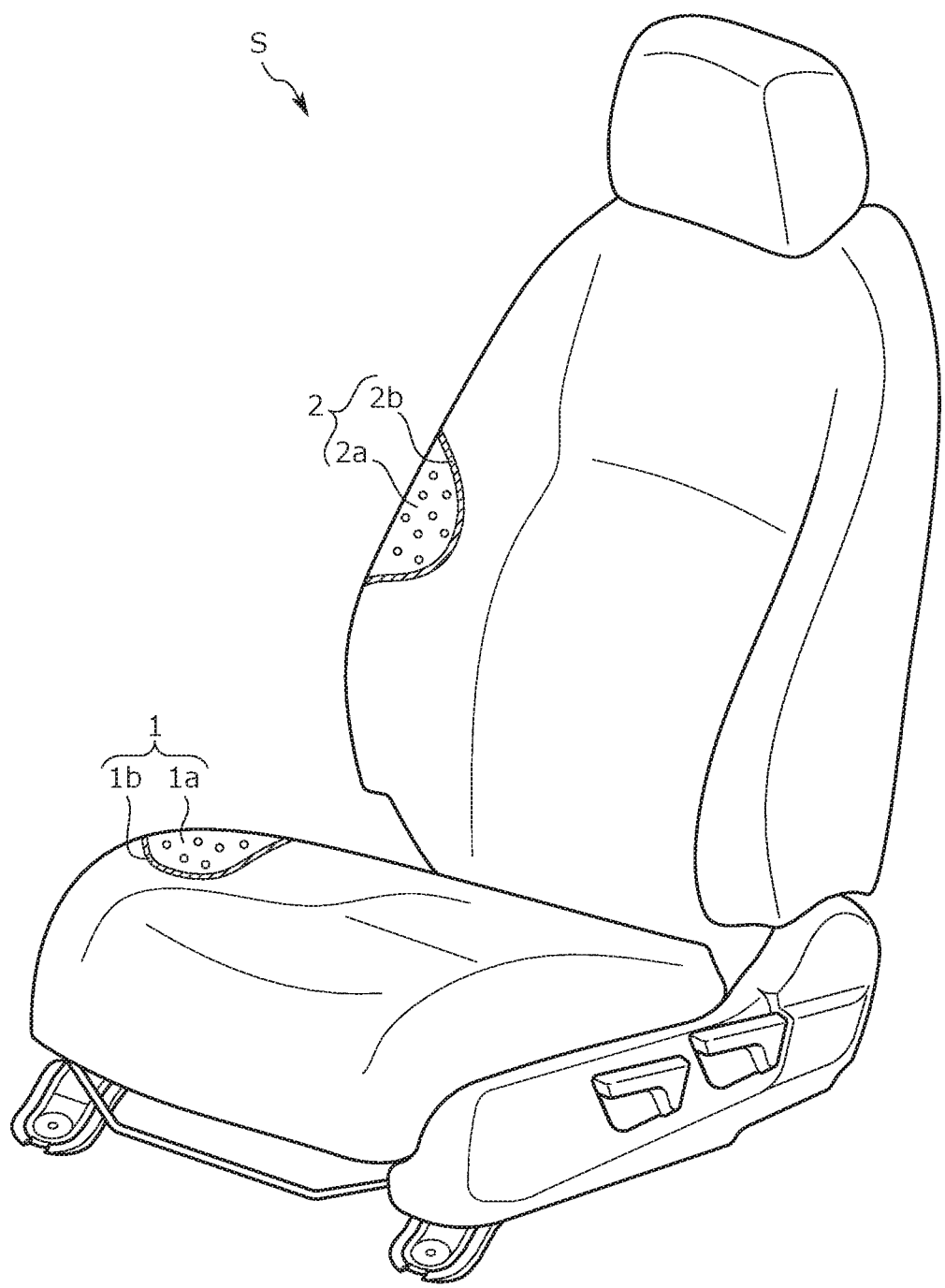
FIG. 1 is a perspective view of a vehicle seat of the present embodiment.
Figure 2:
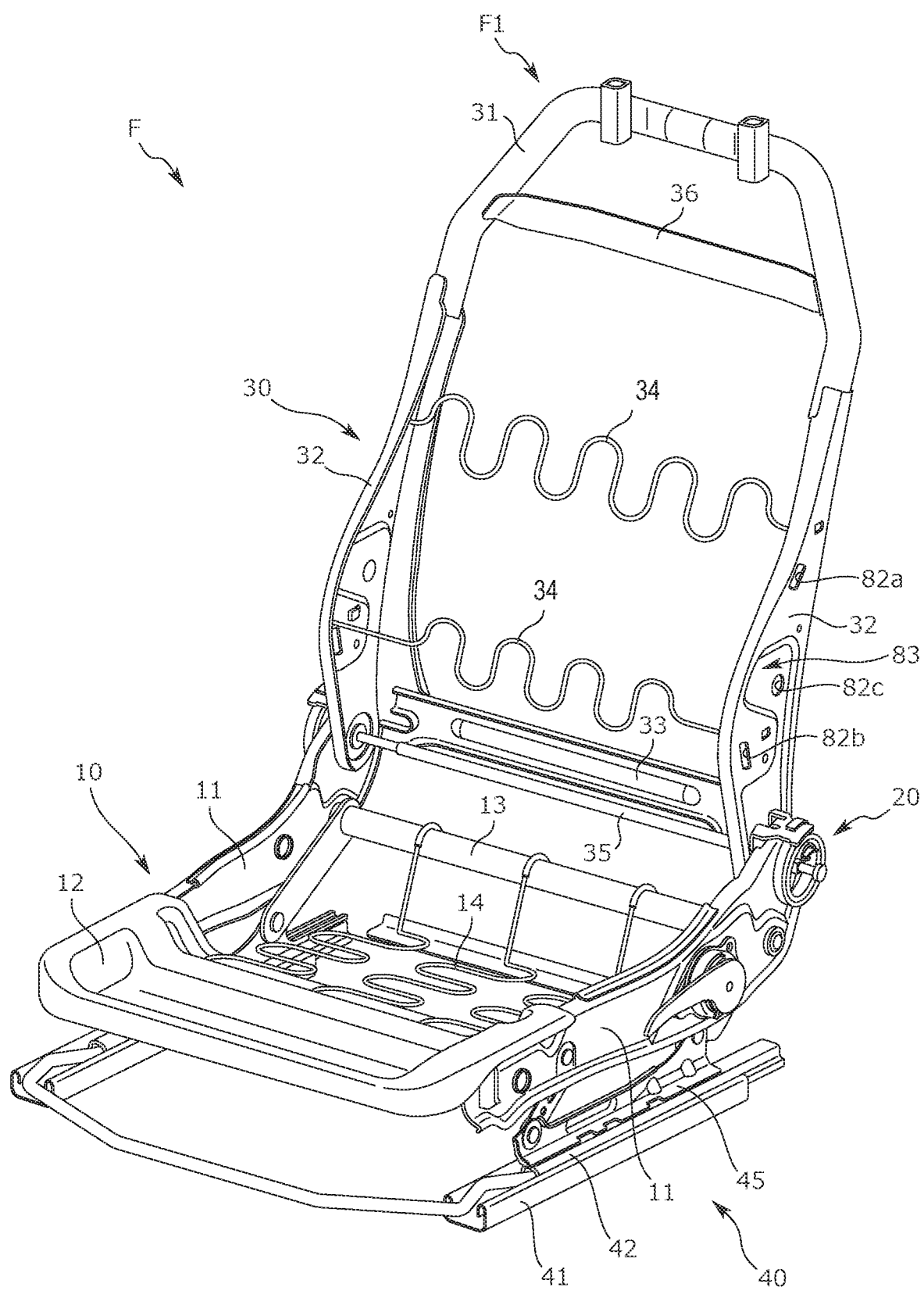
FIG. 2 is a perspective view of a seat frame as a framework of the vehicle seat.

As illustrated in FIGS. 1 and 2, a vehicle seat S of the present embodiment mainly includes a seat body having a seat cushion 1 and a seat back 2, a reclining mechanism 20 rotatably coupling the seat back 2 to the seat cushion 1, a height link mechanism 21 liftably coupling the seat body to a vehicle body floor, and a rail mechanism 40 attached to the vehicle body floor and configured to support the seat body such that the seat body is movable back and forth.

The seat cushion 1 is a seating portion that upwardly supports a seated occupant. As illustrated in FIGS. 1 and 2, the seat cushion 1 is configured such that a cushion pad 1a placed on a cushion frame 10 as a framework is covered with a skin material 1b.

The seat back 2 is a backrest portion supporting the back of the occupant from the back side. The seat back 2 is configured such that a cushion pad 2a placed on a seat back frame 30 as a framework is covered with a skin material 2b.

A vehicle seat frame F is a framework of the vehicle seat S. As illustrated in FIG. 2, the vehicle seat frame F includes the cushion frame 10, the seat back frame 30, and a coupling bracket 50 coupling the cushion frame 10 and the seat back frame 30 together.

As illustrated in FIG. 2, the cushion frame 10 includes a substantially rectangular frame body as the framework of the seat cushion 1. The cushion frame 10 includes cushion side frames 11 arranged respectively on right and left sides, a plate-shaped pan frame 12 coupling front portions of the cushion side frames 11 together, and a pipe-shaped back coupling frame 13 coupling back portions of the cushion side frames 11 together. Further, the cushion frame 10 includes three elastic springs 14 hooked on the pan frame 12 and the back coupling frame 13 and extending in a serpentine-like shape, and a lower pipe (not shown) disposed below the pan frame 12 and coupling the cushion side frames 11 together.

Each cushion side frame 11 is a sheet-metal member that extends in the seat front-to-back direction and has a substantially U-shaped longitudinal cross-section. The reclining mechanism 20 is attached to a back portion of each cushion side frame 11, and the rail mechanism 40 is attached to a lower portion of the reclining mechanism 20 through the height link mechanism 21.

The reclining mechanism 20 is switchable between a lock state that locks a rotation operation of the seat back 2 and an unlock state. The lock state of the reclining mechanism 20 is changed to the unlock state by a reclining operation lever that is operable from a state in which the seat back 2 is locked in a standing posture, and therefore, the standing posture of the seat back 2 can be adjusted.

The height link mechanism 21 is configured to adjust the height of the seat body. The height link mechanism 21 includes, between the cushion frame 10 and the rail mechanism 40, two links attached respectively to the seat front side and the seat back side, and a height adjustment mechanism is provided by operation of these links. Note that each of the right and left cushion side frames 11 includes two links.

The rail mechanism 40 mainly includes right and left lower rails 41 fixed to the vehicle body floor and extending in the seat front-to-back direction, right and left upper rails 42 slidably supported along the lower rails 41, a lock member configured to lock the upper rails 42 such that the upper rails 42 are not slidable, and a rail operation lever configured to unlock a lock state of the lock member.

The lower rails 41 include elongated hollow bodies, and are arranged respectively on the right and left sides with a spacing in a seat width direction. Each lower rail 41 forms, along the seat front-to-back direction, a housing space having a substantially raised section.

Each upper rail 42 includes an elongated body slidably movable along a corresponding one of the lower rails 41 with the upper rail 42 being inserted into the housing space of the lower rail 41. As illustrated in FIG. 2, a link connected to the cushion frame 10 through a rail coupling bracket 45 is coupled to an upper portion of each upper rail 42.

Next, a configuration of the seat back frame 30 is described in detail. As illustrated in FIG. 2, the seat back frame 30 includes an upper frame 31 as a hollow cylindrical body provided on an upper side and formed in a substantially inverted U-shape, right and left side frames 32 coupled respectively to right and left end portions of the upper frame 31, and a lower frame 33 bridged between lower end portions of the right and left side frames 32. Further, the seat back frame 30 includes an elastic spring 34 bridged between inner surfaces of the right and left side frames 32, and an upper cross frame 36 bridged between inner surfaces of curved portions of the upper frame 31.

The right and left side frames 32 are each formed in a substantially U-like shape such that a sheet-metal member is bent inward in the right-to-left direction. The right and left side frames 32 are separated from each other in the right-to-left direction with the side frames 32 extending in the upper-to-lower direction and being substantially parallel to each other. Each side frame 32 has an airbag attachment hole 82a, an airbag attachment hole 82b, and a through-hole 82c as holes for attachment of an airbag unit (not shown). The airbag unit includes, for example, an airbag body, a webbing configured to guide an expansion direction of an airbag, and a plate for attachment of the airbag. For example, the airbag attachment hole 82a and the airbag attachment hole 82b are portions to which the webbing of the airbag is attached, and the through-hole 82c is a portion into which a bolt extending from a module of the airbag is inserted. Moreover, a bead portion is formed at the periphery of the through-hole 82c. In particular, a substantially U-shaped bead portion 83 is formed on the seat front side of the through-hole 82c between the airbag attachment hole 82a and the airbag attachment hole 82b.

An inner surface of an upper end portion of the right side frame 32 and a right end portion of the upper frame 31 are arranged in contact with each other. Moreover, the upper end portion of the right side frame 32 and the right end portion of the upper frame 31 are fixed by welding. Similarly, an inner surface of an upper end portion of the left side frame 32 and a left end portion of the upper frame 31 are arranged in contact with each other. Moreover, the upper end portion of the left side frame 32 and the left end portion of the upper frame 31 are fixed by welding. Note that various types of welding such as laser welding and arc welding may be used as welding.

As illustrated in FIG. 2, the lower frame 33 includes a frame center portion extending in the right-to-left direction, and end portions formed in such a manner that portions extending from the frame center portion toward the right and left sides are bent to face each other.

An inner surface of the right end portion of the lower frame 33 is disposed in contact with the right side frame 32. Moreover, the lower end portion of the right side frame 32 and the right end portion of the lower frame 33 are fixed by welding. Similarly, an inner surface of the left end portion of the lower frame 33 is disposed in contact with the left side frame 32. Moreover, the lower end portion of the left side frame 32 and the left end portion of the lower frame 33 are fixed by welding.

An end portion of each side frame 32 has a shaft through-hole penetrating in the right-to-left direction. A coupling shaft 35 penetrates the reclining mechanism 20, the coupling bracket 50 coupling the reclining mechanism 20 and the cushion frame 10 together, and the lower end portions of the right and left side frames 32, thereby fixing each portion. Moreover, the coupling shaft 35 serves as a rotary shaft when the seat back frame 30 is rotated by the reclining mechanism 20.

In the seat frame of the present embodiment, the thermal treatment of a strength adjustment portion of the seat frame for performing a partial hardness adjustment is performed in a state in which a frame member molded mainly using a high tensile strength steel plate (e.g., a 440 megapascals (MPa) material) is assembled by welding etc. In the present embodiment, the above-described thermal treatment is performed by heating treatment using a laser and cooling treatment for a heated portion, but the present disclosure is not limited to such treatment. Moreover, the above-described frame member is an element forming the seat frame. For example, each member forming the seat back frame 30, each member forming the cushion frame 10, and the bracket coupling the seat back frame 30 and the cushion frame 10 together are examples of the above-described frame member.

Specifically, the thermal treatment (the thermal treatment for strength improvement) is performed such that strength is increased at the periphery of a welding portion between the upper frame 31 and each side frame 32 and the periphery of a welding portion between each side frame 32 and the lower frame 33. The above-described thermal treatment for strength improvement is performed in such a manner that the heating treatment and a cooling rate in the subsequent cooling treatment are controlled. Note that a portion whose metal structure (e.g., microstructure) has been changed by the thermal treatment for strength improvement is referred to as a "high strength portion."

Moreover, in the seat frame of the present embodiment, the thermal treatment (the thermal treatment for strength reduction) is performed such that the strength is decreased at a portion of the coupling bracket 50 coupling the cushion frame 10 and the seat back frame 30 together, the periphery of each lower end portion of the right and left side frames 32 forming the seat back frame 30, or the periphery of each back end portion of the cushion side frames 11 forming the cushion frame 10. The above-described thermal treatment for strength reduction is performed in such a manner that the heating treatment and the cooling rate in the subsequent cooling treatment are controlled. Note that a portion whose metal structure has been changed by the thermal treatment for strength reduction is referred to as a "low strength portion." A relationship among thermal treatment conditions (e.g., cooling rates) and a steel structure change is described below.

Figure 3:
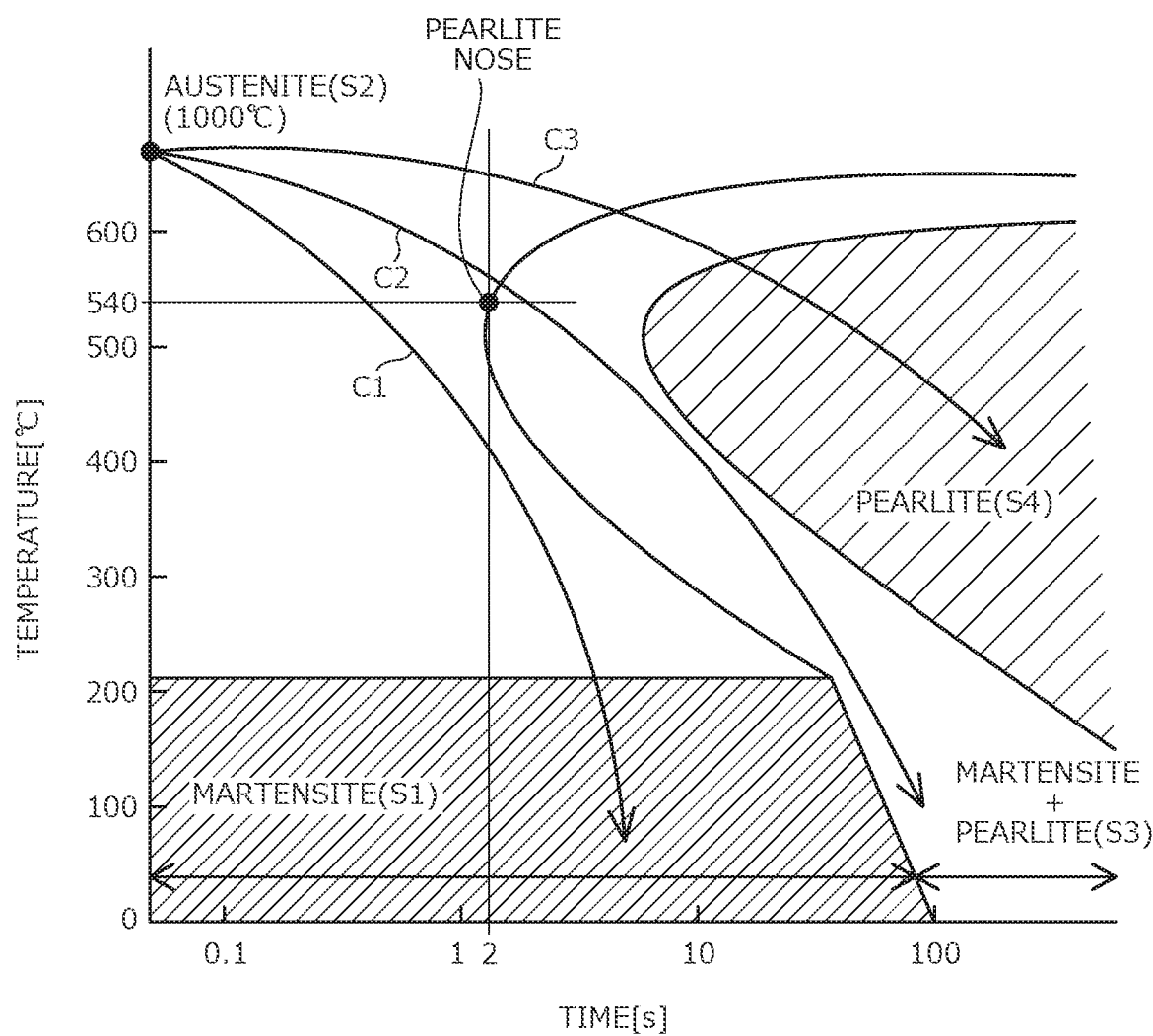
FIG. 3 is a graph for describing a relationship among thermal treatment conditions and a metal structure.

FIG. 3 shows classification of metal (steel) microstructures transitioning from an austenite structure (S2) to other, different microstructures, due to cooling rate differences, after steel has been heated to a temperature equal to or higher than an A1 transformation point (heated to 1000° C., in the example shown in FIG. 3), and accordingly, has been transformed into the austenite structure.

As shown in FIG. 3, when the steel with the austenite structure at 1000° C. is cooled at such a cooling rate (a "critical" cooling rate) that the steel reaches a temperature equal to or lower than 540° C. within two seconds (e.g., a cooling curve C1), the austenite structure transitions to a martensite structure (S1).

Moreover, as shown in FIG. 3, when the steel with the austenite structure at 1000° C. is cooled at a cooling rate lower than the cooling rate at which the steel reaches 540° C. within two seconds (e.g., a cooling curve C2 or C3), the austenite structure transitions to a metal structure that includes a pearlite structure (S3, S4). In this case, when the cooling curve is C2, the martensite structure and the pearlite structure are mixed together (S3). When the cooling rate is lower for cooling with the cooling curve C3, this results in the pearlite structure (S4).

Note that the relative hardness of the metal structure satisfies the following:

$$martensite(S1) > martensite+pearlite(S3) > pearlite(S4).$$

For example, a method in which dry ice powder is sprayed onto a thermal treatment portion, a method in which cooled air is sprayed onto the thermal treatment portion, and a method in which dry mist is sprayed onto the thermal treatment portion may be used as the method for cooling the steel heated to change into the austenite structure. Among these methods, cooling using dry mist is preferable for satisfying a cooling rate equal to or higher than the "critical" cooling rate (cooling curve C1). For example, at a cooling step using dry mist, low-temperature dry mist containing a slight amount of moisture in cooled air may be utilized. In this case, a mist particle size is preferably about 30 µm, for example. At a quenching step, the above-described low-temperature dry mist is used so that the amount of moisture used for cooling can be reduced while efficient cooling can be performed. Thus, quenching can be also performed for the periphery of a component suspected to be damaged due to water, such as an electronic device. Moreover, the amount of moisture used for cooling can be reduced, and a mostly waterproof mechanism is not necessarily employed. Thus, a cost of the quenching step can be reduced.

In the present embodiment, in the case of increasing the strength by the thermal treatment, the cooling rate is controlled such that the metal structure of the thermal treatment portion is transformed into martensite. On the other hand, in the case of decreasing the strength by the thermal treatment, the cooling rate is controlled such that the metal structure of the thermal treatment portion is transformed to include pearlite.

Next, the specific thermal treatment portion of the vehicle seat frame F of the present embodiment is described with reference to FIGS. 4 to 7. First, a specific example of a formation portion of the high strength portion formed in such a manner that the thermal treatment for increasing the strength is performed for a portion of the vehicle seat frame F is described.

Figure 4:
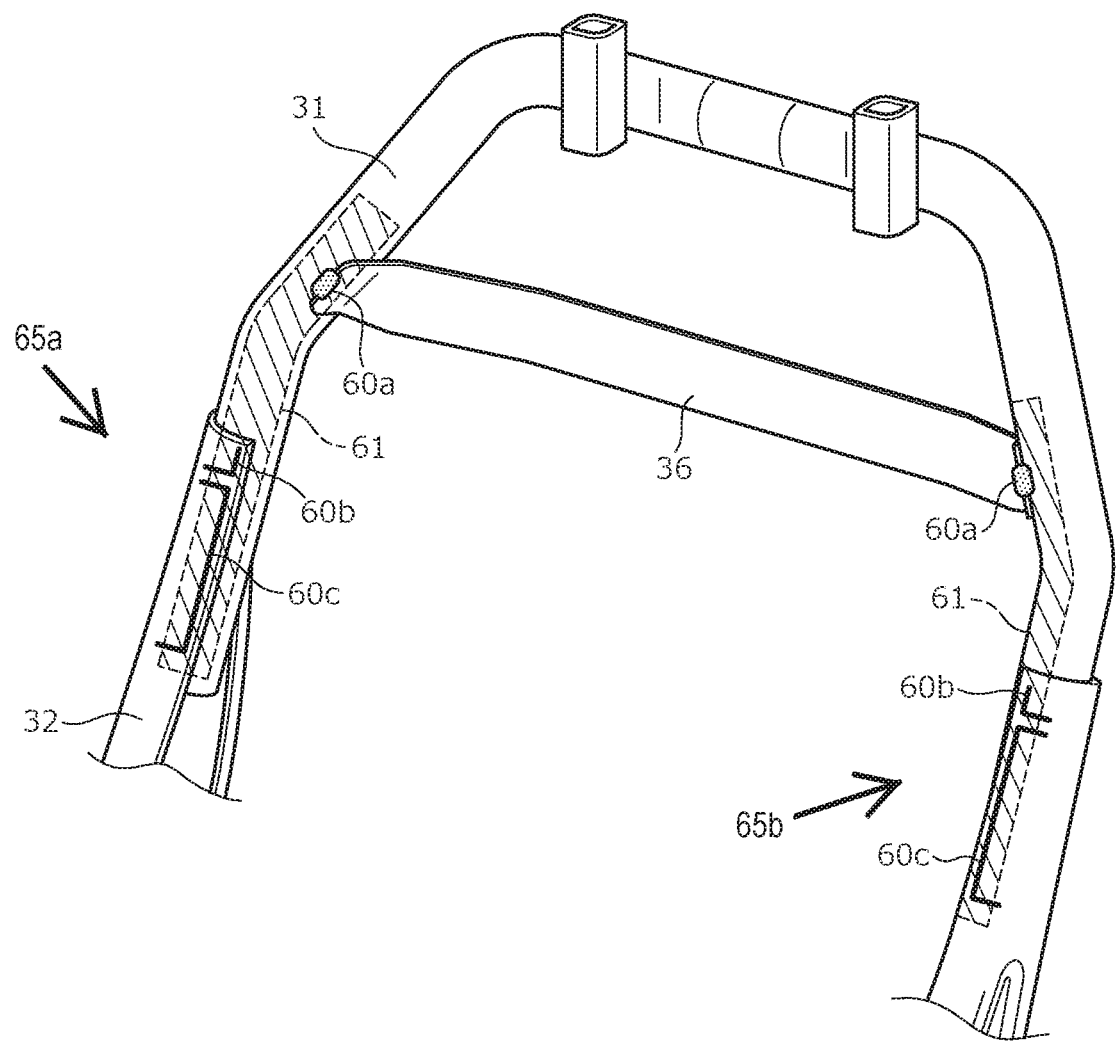
FIG. 4 is an enlarged view of an upper portion of FIG. 2, the view being a perspective view of an example of a thermal treatment portion at a joint portion between an upper frame and each side frame.

FIG. 4 is an enlarged view of a main portion of FIG. 2, the view being a perspective view of an example of a high strength portion formed at a joint portion between the upper frame 31 and each side frame 32. In FIG. 4, the upper frame 31 and the upper cross frame 36 are welded (arc-welded) at a welding portion 60a. Moreover, the upper frame 31 and each side frame 32 are welded (laser-welded) at welding portions 60b, 60c. Note that the form of welding has been set forth as an example, and is not limited to the form of welding of the present embodiment as illustrated in the figure.

Each high strength portion 61 illustrated in FIG. 4 is provided in a region including at least a portion of the welding portions 60a, 60b, 60c formed between the upper frame 31 and the side frame 32. The high strength portion 61 described herein may be provided across the entire circumferences of sections of the upper frame 31 and the side frame 32, or may be provided partially at each section.

Note that the following thermal treatment for strength improvement is performed for each high strength portion 61. That is, in the thermal treatment for strength improvement, the steel transformed into the austenite structure by heating to 1000° C. is changed into the martensite structure by quenching to a temperature equal to or lower than 540° C. within two seconds. Thus, the hardness of the high strength portion 61 subjected to the above-described thermal treatment for strength improvement becomes higher than that of a portion not subjected to the above-described thermal treatment for strength improvement. Thus, the strength of the joint portion between the upper frame 31 and the side frame 32 can be locally improved.

Figure 5:
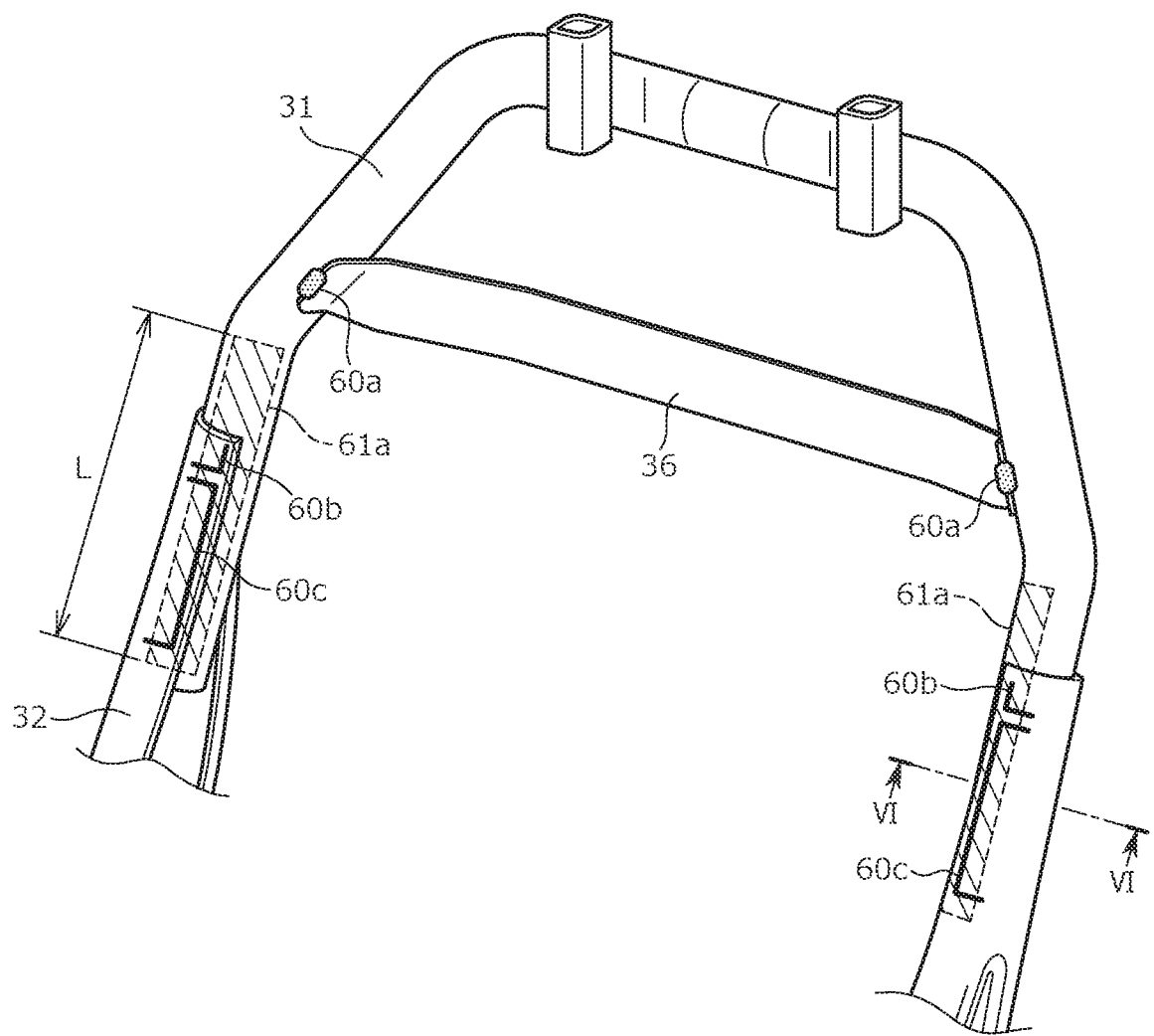
FIG. 5 is an enlarged view of the upper portion of FIG. 2, the view being a perspective view of another example of the thermal treatment portion at the joint portion between the upper frame and each side frame.

Next, another example of the high strength portion formed at the joint portion between the upper frame 31 and each side frame 32 is described with reference to FIGS. 5 and 6. FIG. 5 is an enlarged view of the main portion of FIG. 2, the view being a perspective view of another example of the high strength portion formed at the joint portion between the upper frame 31 and each side frame 32. Moreover, FIG. 6 is a cross-sectional view along a VI-VI line of FIG. 5, the view being a cross-sectional view of the high strength portion formed at the joint portion between the upper frame 31 and the side frame 32.

Figure 6:
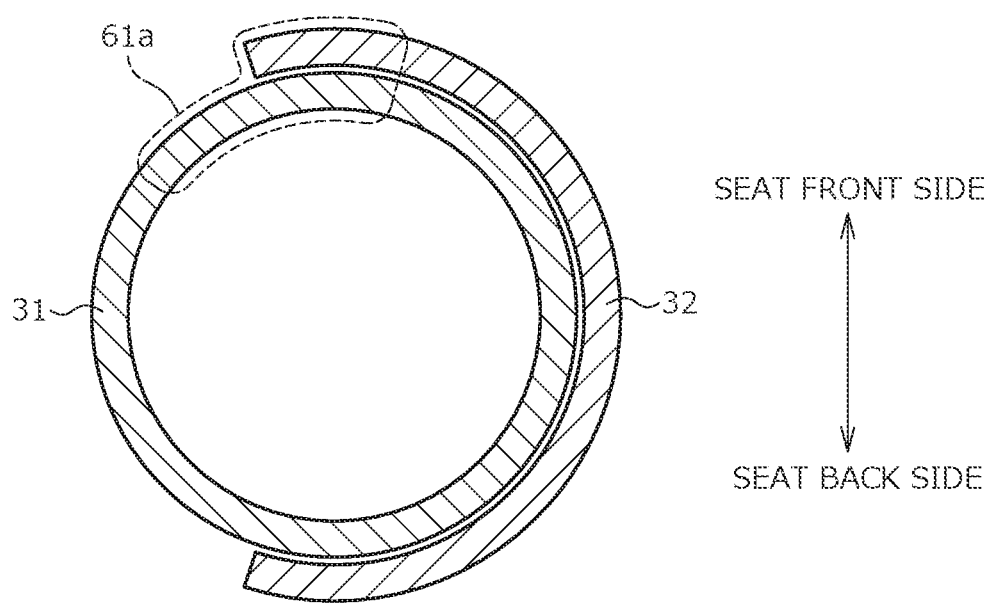
FIG. 6 is a cross-sectional view along a VI-VI line of FIG. 5, the view being a cross-sectional view of the thermal treatment portion at the joint portion between the upper frame and the side frame.

As illustrated in FIGS. 5 and 6, each high strength portion 61a has a narrower area than that of the high strength portion 61 illustrated in FIG. 4. That is, the high strength portion 61a is provided in a region including the welding portion between the upper frame 31 and the side frame 32, but not including the welding portion between the upper cross frame 36 and the upper frame 31. Moreover, as illustrated in FIG. 6, the high strength portion 61a is provided at seat-front-side portions of the sections of the upper frame 31 and the side frame 32, and is not necessarily provided at seat-back-side portions.

Note that the thermal treatment for strength improvement is also performed for the high strength portion 61a such that a metal structure of the high strength portion 61a is transformed into martensite. Thus, in the example illustrated in FIGS. 5 and 6, the strength of the periphery of the joint portion between the upper frame 31 and the side frame 32 on the seat front side on which stress concentrates upon vehicle collision can be locally improved.

Figure 7:
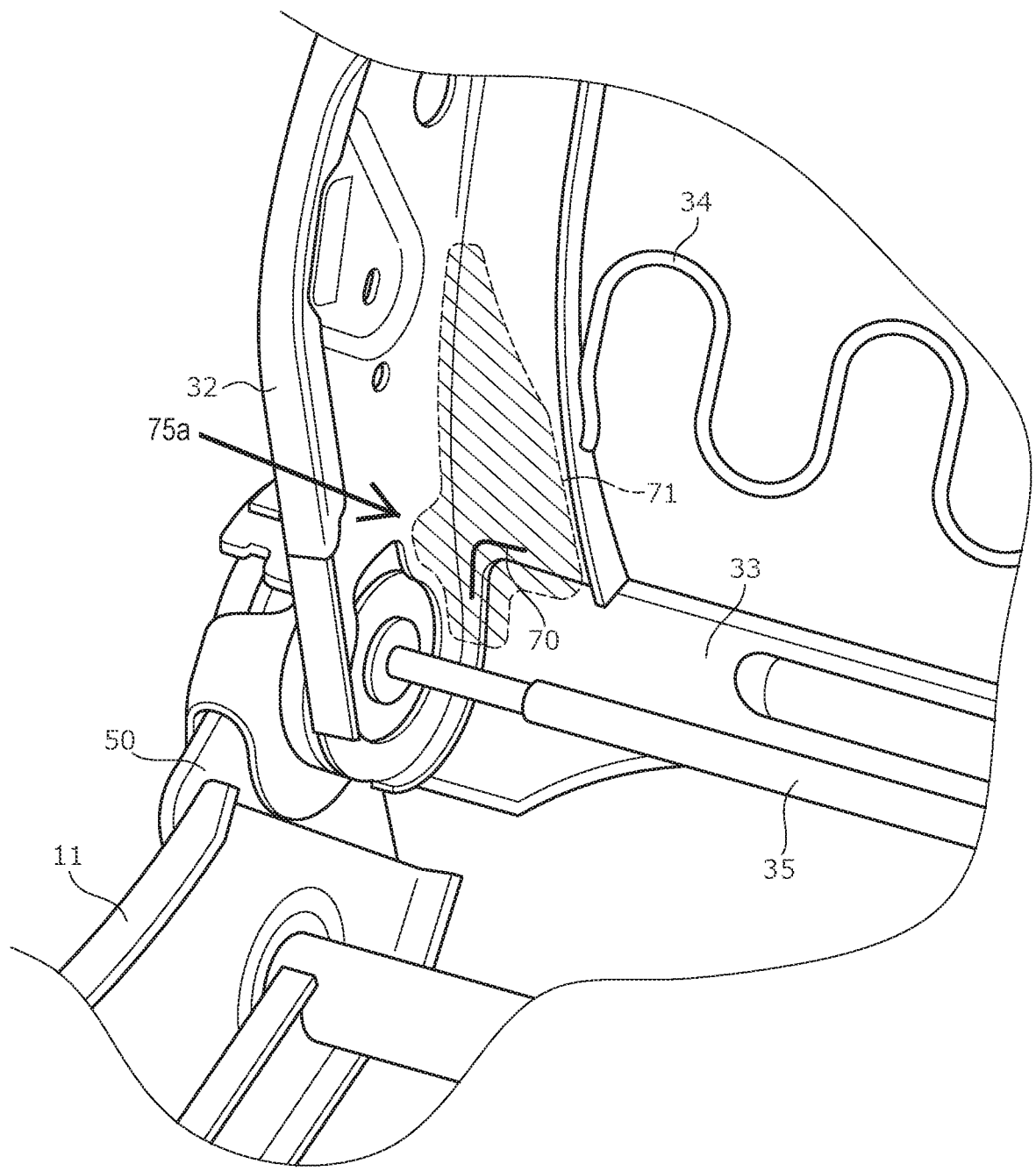
FIG. 7 is an enlarged view of a joint portion between the side frame and a lower frame of FIG. 2, the view being a view of an example of a thermal treatment portion at the joint portion.

Next, as illustrated in FIG. 7, a high strength portion may be provided at a joint portion between the side frame 32 and the lower frame 33, for example. FIG. 7 is an enlarged view of a joint portion between the side frame 32 and the lower frame 33 of FIG. 2, the view being a perspective view of an example of the high strength portion formed at the joint portion. In FIG. 7, the side frame 32 and the lower frame 33 are welded (laser-welded) at a welding portion 70.

The high strength portion 71 illustrated in FIG. 7 is provided in a region including the welding portion 70 between the side frame 32 and the lower frame 33. In this example, for the high strength portion 71, the thermal treatment for strength improvement is performed, in which the steel transformed into the austenite structure by heating to 1000° C. is changed into the martensite structure by quenching to a temperature equal to or lower than 540° C. within two seconds. Thus, the hardness of the high strength portion 71 becomes higher than that of a portion not subjected to the above-described thermal treatment for strength improvement, and therefore, the strength of the joint portion between the side frame 32 and the lower frame 33 can be improved.

Next, a specific example of a formation portion of the low strength portion formed at the frame member forming the vehicle seat frame F by the thermal treatment for decreasing the strength is described with reference to FIGS. 8 and 9.

Figure 8:
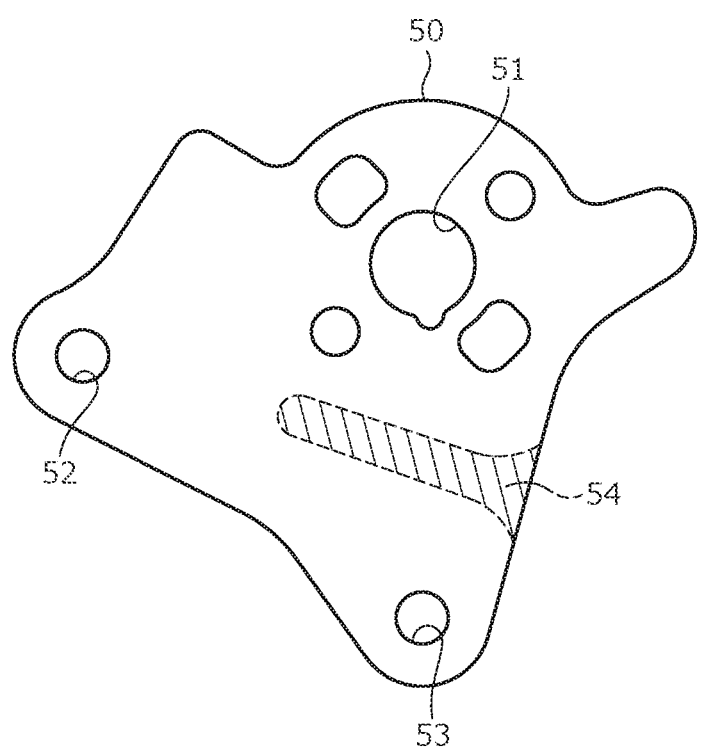
FIG. 8 is a side view of an example of a thermal treatment portion at a coupling bracket.

As illustrated in FIG. 8, a low strength portion 54 is provided at a portion of the coupling bracket 50 coupling the cushion frame 10 and the seat back frame 30 together. The coupling bracket 50 has bolt fastening holes 52, 53 into each of which a bolt for fastening the cushion side frame 11 and the coupling bracket 50 together is inserted and with a shaft insertion hole 51 for the coupling shaft 35. The reclining mechanism 20 is attached to the coupling shaft 35, and the seat back frame 30 is coupled to the coupling bracket 50 through the reclining mechanism 20.

In the coupling bracket 50 illustrated in FIG. 8, the low strength portion having a lower strength than that of the periphery of the low strength portion is provided between a portion coupled to the cushion frame 10 and a portion coupled to the seat back frame 30. That is, in the coupling bracket 50 illustrated in FIG. 8, the low strength portion 54 whose metal structure has been changed, by thermal treatment, into, e.g., the pearlite structure with a lower hardness than the periphery of the low strength portion 54 is formed between the shaft insertion hole 51 and the bolt fastening hole 53.

The thermal treatment for strength reduction as described below is performed for the low strength portion 54. That is, in the thermal treatment for strength reduction, the steel transformed into the austenite structure by heating to 1000° C. with the laser is slowly cooled at a cooling rate lower than the critical cooling rate by, e.g., natural cooling (self-cooling), thereby changing into the pearlite structure. Note that in the case of using a high tensile strength steel plate with a strength equal to or higher than that of a 780 material (a tensile strength of 780 MPa), the hardness of the low strength portion 54 is, by the above-described thermal treatment for strength reduction, decreased as compared to those of metal structures of a portion subjected to the thermal treatment for strength improvement and other portions not subjected to the thermal treatment, and therefore, the strength of the coupling bracket 50 can be partially decreased. Upon vehicle collision, the low strength portion 54 as a weak portion deforms so that stress concentration on the seat back frame 30 can be reduced. That is, the low strength portion 54 functions as the weak portion so that impact upon vehicle collision can be efficiently absorbed.

Figure 9:
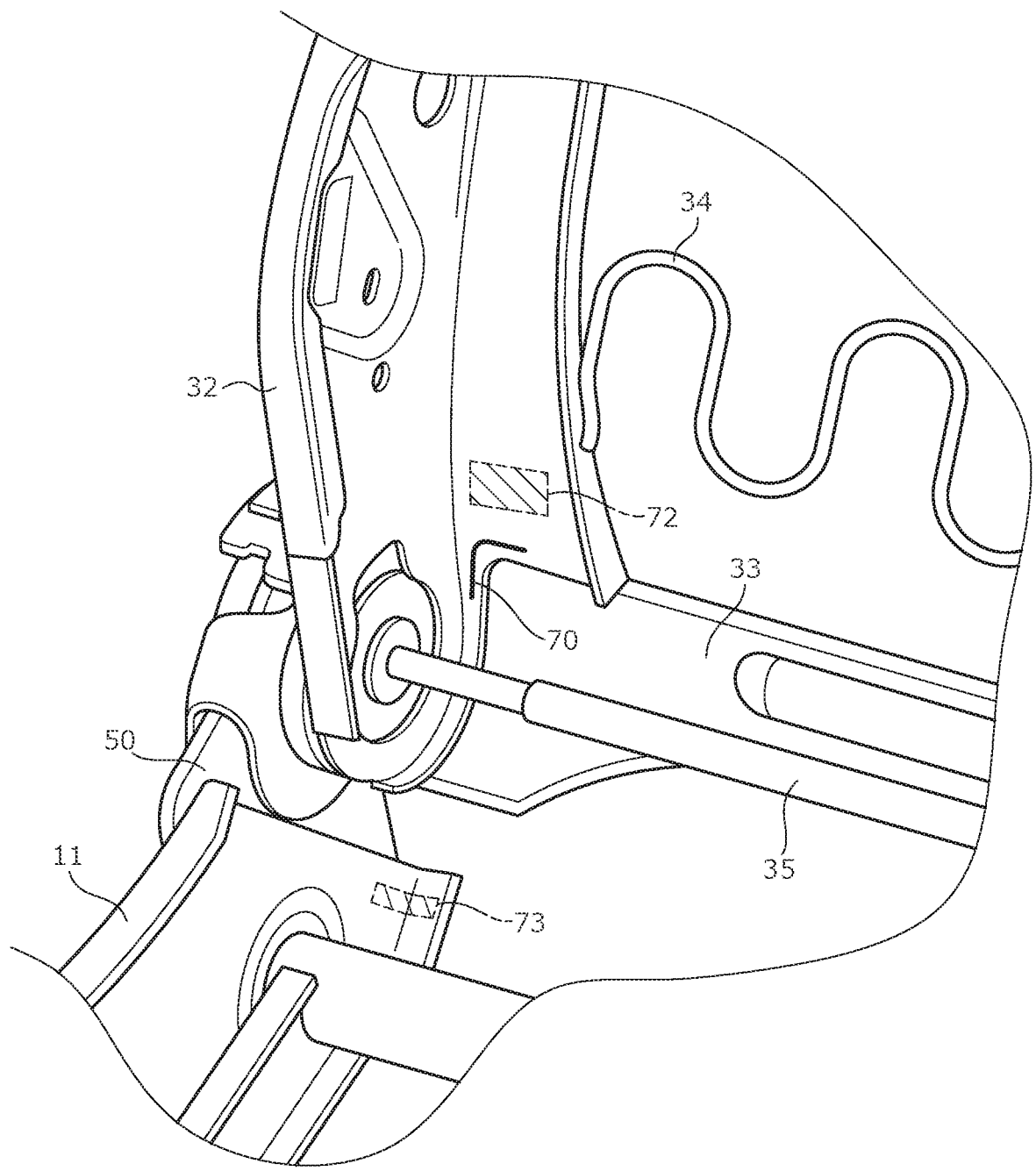
FIG. 9 is an enlarged view of an example of thermal treatment portions of a seat back frame and a cushion frame.

Moreover, as illustrated in FIG. 9, a low strength portion 72 may be provided at the periphery of the lower end portion of the side frame 32 forming the seat back frame 30. The lower end portion of the side frame 32 as described herein indicates the end portion of the side frame 32 closer to the joint portion between the side frame 32 and the lower frame 33. Note that the low strength portion 72 is also formed by the thermal treatment for strength reduction as described above. As described above, the low strength portion 72 is provided at the periphery of the lower end portion of the side frame 32, and the low strength portion 72 as the weak portion deforms upon vehicle collision. Thus, impact upon vehicle collision can be efficiently absorbed.

Further, as illustrated in FIG. 9, a low strength portion 73 is provided at the periphery of the back end portion of the cushion side frame 11 forming the cushion frame 10. The back end portion of the cushion side frame 11 as described herein indicates the seat-back-side end portion of the cushion side frame 11. Note that the low strength portion 73 is also formed by the thermal treatment for strength reduction as described above. As described above, the low strength portion 73 is provided at the periphery of the back end portion of the cushion side frame 11, and the low strength portion 73 as a weak portion deforms upon vehicle collision. Thus, impact upon vehicle collision can be efficiently absorbed. Note that in the case of forming any one of the above-described low strength portions 54, 72, 73, the other low strength portions are not necessarily formed.

In the vehicle seat frame of the above-described embodiment, the thermal treatment portion is transformed into the austenite structure by heating to a temperature equal to or higher than a predetermined temperature (a temperature equal to or higher than the A1 transformation point, such as 1000° C.) with the laser, and subsequently, the cooling rate for such a portion is controlled such that the thermal treatment portion transitions to the metal structure with the different strength. Thus, the strength of the thermal treatment portion of the vehicle seat frame can be differentiated from those of other portions without changing the shape, material, etc. of the vehicle seat frame. Moreover, in the vehicle seat frame of the above-described embodiment, control of the cooling rate is, after the heating treatment, is performed for a target portion for strength adjustment (i.e., a strength adjustment target portion of a frame comp product) in a state in which the frame members forming the vehicle seat frame are assembled by, e.g., welding. In this manner, the strength of the target portion can be adjusted.

Further, in the vehicle seat frame of the above-described embodiment, the target portion of the vehicle seat frame is heated to a temperature equal to or higher than 1000° C. with the laser, and then, is cooled at a cooling rate equal to or higher than a predetermined cooling rate (e.g., equal to or higher than 230° C. per second). In this manner, the thermal treatment portion transitions, for example, from the austenite structure to the martensite structure. Thus, the strength of the target portion can be increased without a shape change, a thickness change, reinforcement member addition, a material change, etc. With this configuration, in the seat frame molded from the high tensile strength steel plate, a strength (equal to or higher than 980 MPa) equivalent to that of an extra-high tensile strength steel plate can be partially obtained.

In addition, in the vehicle seat frame of the above-described embodiment, cooling is performed at a cooling rate lower than the predetermined cooling rate (e.g., natural cooling) after heating with the laser. The thermal treatment portion transitions, for example, from the austenite structure to the pearlite structure so that the strength of a necessary portion can be decreased without a shape change, a thickness change, processing of a raised-recessed portion, a cutout, etc., a material change, etc.

Moreover, the step of forming the high strength portions and the low strength portions at the seat frame by the thermal treatment can also be performed after assembly of the frame members, leading to a high degree of freedom in a manufacturing step. In the case of using the laser to weld the frame members forming the seat frame, the thermal treatment portion can be heated using a facility, a jig, or a manufacturing line for laser welding. Thus, a manufacturing cost can be reduced, leading to easy mass production.

Further, in the vehicle seat frame of the above-described embodiment, a planar portion for, e.g., component attachment is easily ensured, and there are no surface protrusions and cutouts. This leads to a compact shape.

In addition, there are no specific limitations on a component targeted for strength adjustment by the thermal treatment according to the present disclosure, and such a component may be any one of a pipe and a press product.

Moreover, in the vehicle seat frame of the above-described embodiment, an oxide layer remains as a manufacturing mark after laser heating. Even if the oxide layer is coated for erasing the mark, checking by means of an electronic microscope or handy energization can be performed.

Other Embodiments

The vehicle seat frame of the present disclosure is similarly applicable not only to a front seat frame but also to a back seat frame.

Figure 10:
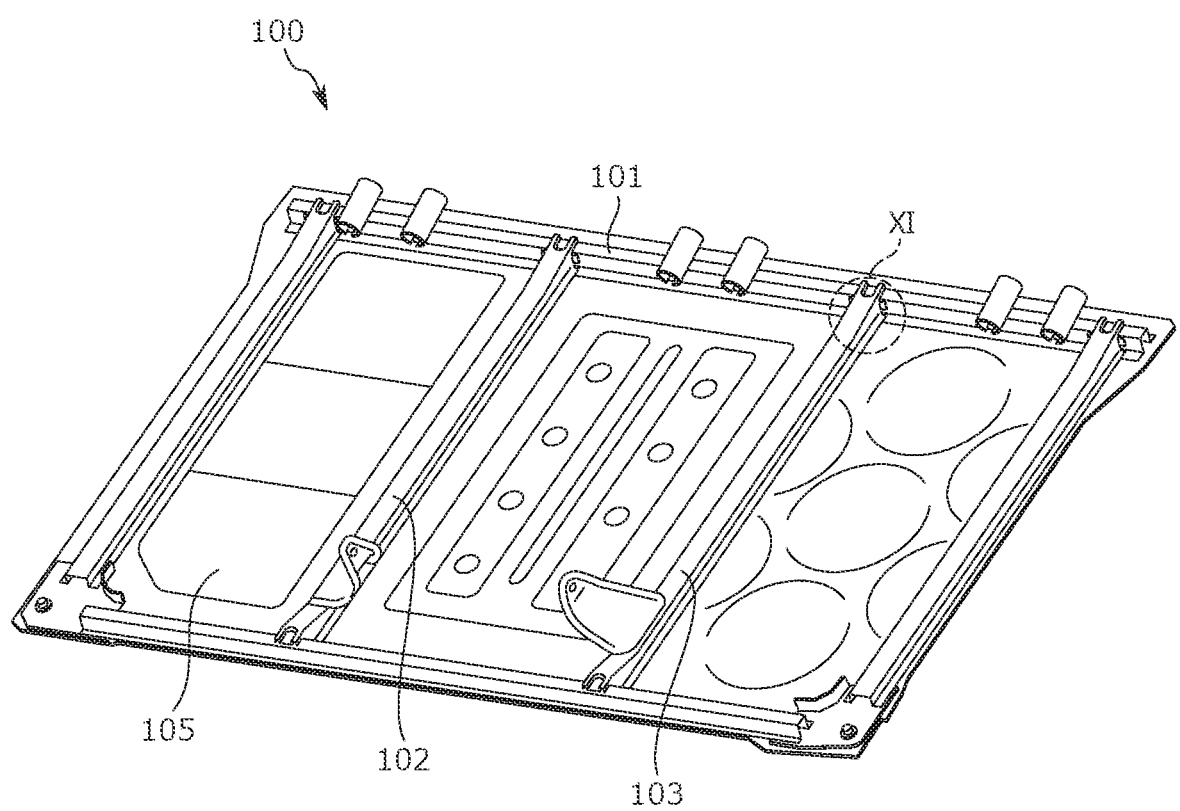
FIG. 10 is a perspective view of a seat back frame of a back seat.
Figure 11:
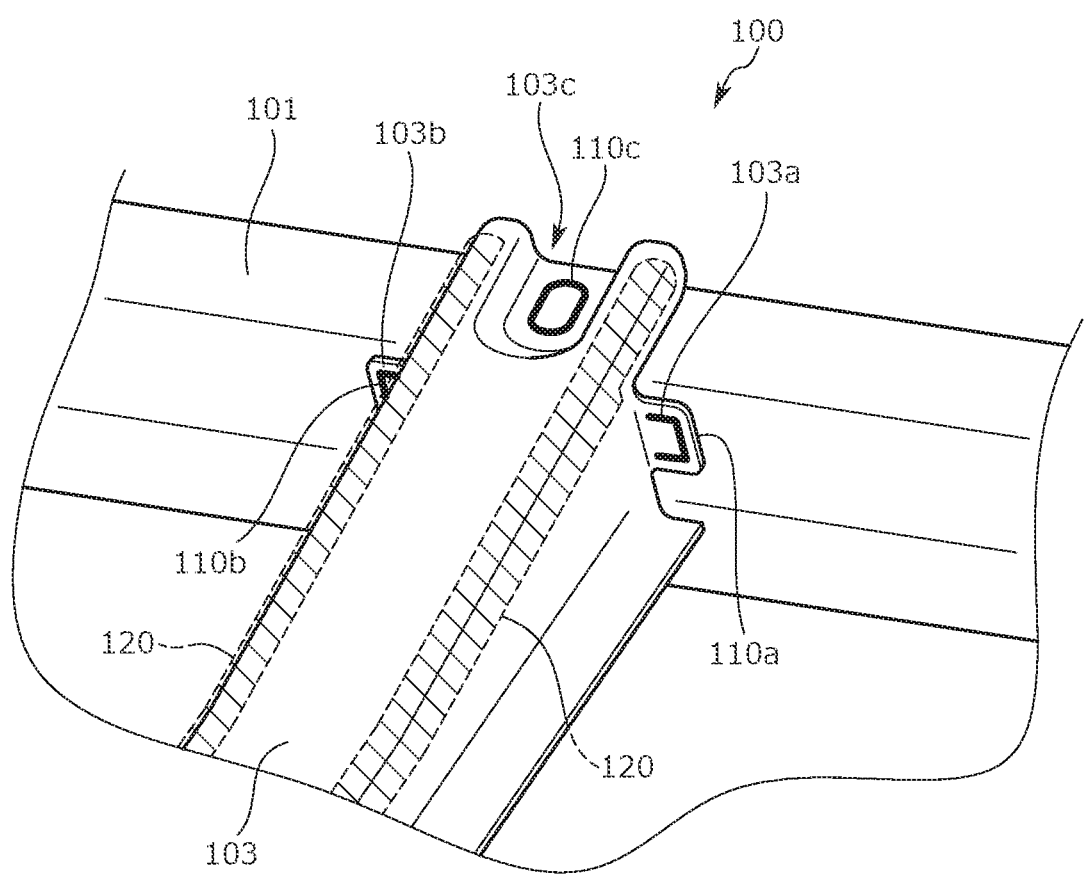
FIG. 11 is an enlarged view of a portion XI of FIG. 9, the view being a perspective view of thermal treatment portions at a joint portion of a frame framework portion.

FIG. 10 is a perspective view of a rear back frame 100 of a back seat. FIG. 11 illustrates an enlarged view of a main portion of FIG. 10, the view being a perspective view of a thermal treatment portion at a joint portion of a frame framework portion.

As illustrated in FIG. 10, the rear back frame 100 includes rectangular rod-shaped framework frames (e.g., framework frames 101, 102, 103) forming a framework of the rear back frame 100, and a plate-shaped pan frame (e.g., a rear pan frame 105) forming a surface of the rear back frame 100. The framework frame (e.g., the framework frame 101) serving as a framework in a transverse direction of a seat back frame and the framework frames (e.g., the framework frames 102, 103) serving as frameworks in a longitudinal direction of the seat back frame are welded together. In an example illustrated in FIG. 10, the frames are laser-welded together, but may be joined together by other types of welding such as arc welding.

FIG. 11 illustrates enlarging a joint portion XI between the framework frame 101 and the framework frame 103 in the rear back frame 100 illustrated in FIG. 10. As illustrated in FIG. 11, the framework frame 101 and a flange portion 103a of the framework frame 103 are welded together at a welding portion 110a. The framework frame 101 and a flange portion 103b of the framework frame 103 are welded together at a welding portion 110b. The framework frame 101 and a recessed portion 103c of the framework frame 103 are welded at a welding portion 110c.

As illustrated in FIG. 11, in the rear back frame 100 according to one embodiment of the present disclosure, high strength portions 120 of ridge portions of the framework frame 103 forming the rear back frame 100 are subjected to thermal treatment for strength improvement. For example, in the thermal treatment for strength improvement, steel transformed into an austenite structure by heating to 1000° C. is changed into a martensite structure by quenching to a temperature equal to or lower than 540° C. within two seconds. In this manner, the hardness of each high strength portion 120 becomes higher than those of metal structures of a portion subjected to thermal treatment for strength reduction and other portions not subjected to the thermal treatment. Thus, the strength of the framework frame 103 can be improved. Moreover, the strengths of the framework frames and the pan frame other than the framework frame 103 may be partially adjusted by the thermal treatment for strength improvement or the thermal treatment for strength reduction.

In the above-described embodiment, the vehicle seat S is configured to include the height link mechanism 21 and the rail mechanism 40 as illustrated in FIG. 2, but does not necessarily have this configuration. For example, a base member fixed to the vehicle body floor and the cushion frame 10 (the cushion side frames 11) may be directly coupled together. Moreover, the coupling bracket 50 may be formed integrally with the cushion side frames 11, and in this manner, the number of components may be reduced.

Variation of Seat Back Frame

Next, a vehicle seat frame F1 of a variation of the present disclosure is described with reference to FIGS. 12 to 15. The vehicle seat frame F1 is mainly different from the vehicle seat frame F in the configuration of the side frame 32 and the thermal treatment portion. Regarding the vehicle seat frame F1, differences from the vehicle seat frame F are mainly described below.

Figure 12:
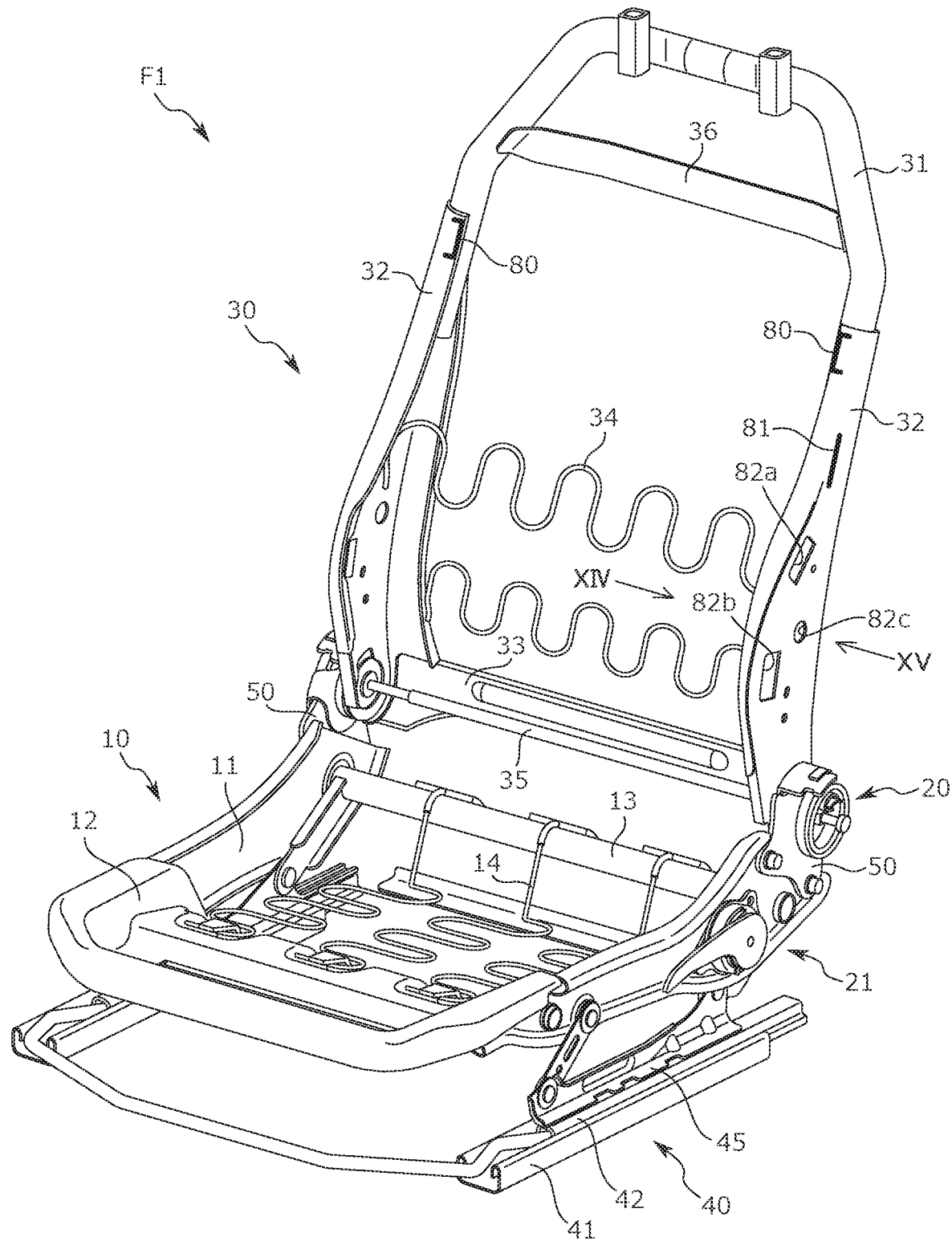
FIG. 12 is a perspective view of a vehicle seat frame of a variation of the present disclosure.
Figure 13:
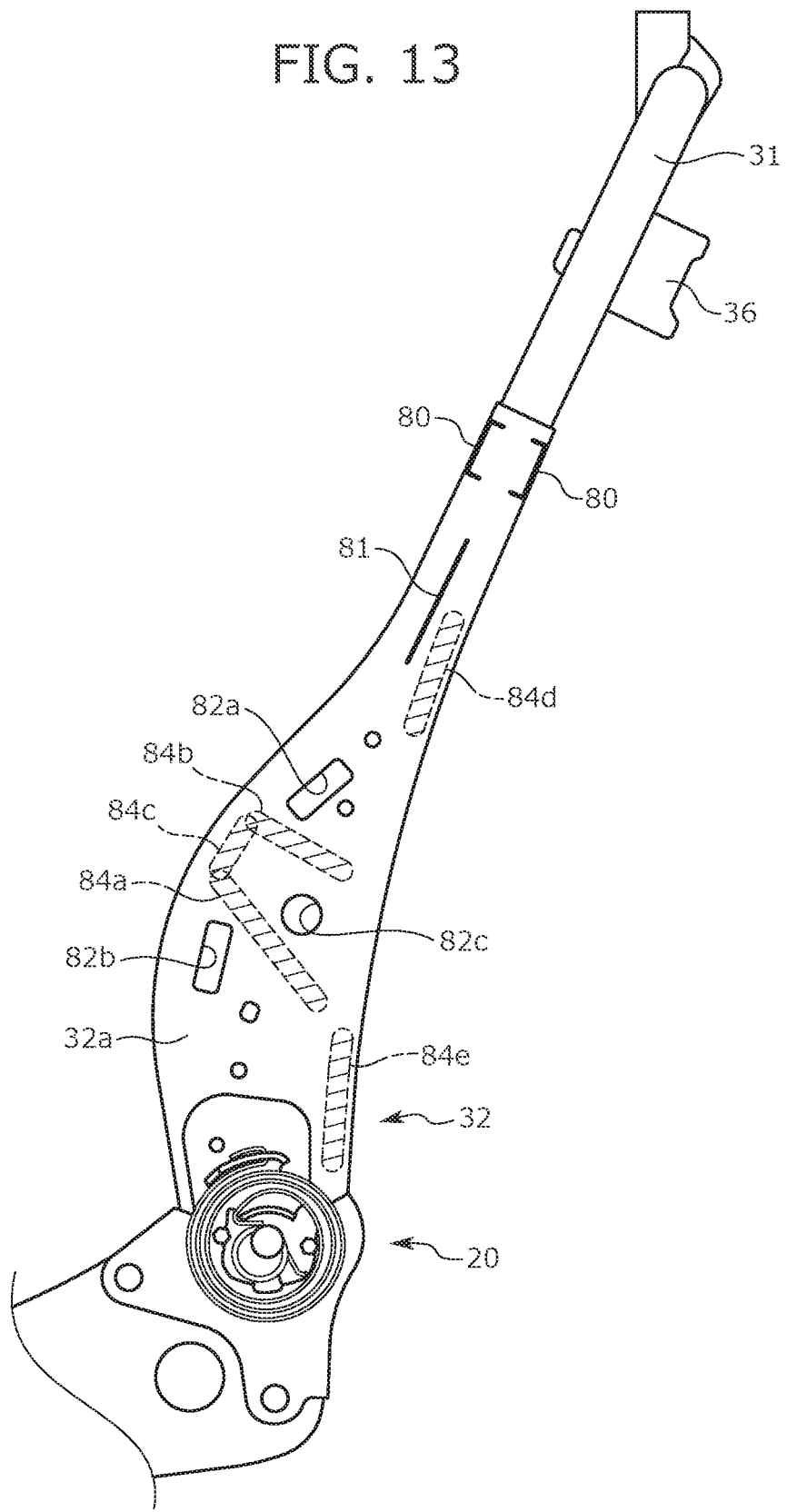
FIG. 13 is a side view of thermal treatment portions of the vehicle seat frame of the variation.

As illustrated in FIGS. 12 and 13, the side frames 32 of the vehicle seat frame F1 are joined to the upper frame 31 at welding portions 80 and welding portions 81. The welding portions 80 are substantially U-shaped welding portions provided at two portions of the upper end portions of the side frames 32. The welding portions 80 join the upper end portions of the side frames 32 and the upper frame 31 together. Moreover, each welding portion 81 is a linear welding portion provided below a corresponding one of the welding portions 80. Each welding portion 81 joins a lower end portion of the upper frame 31 and a corresponding one of the side frames 32 together.

Figure 15:
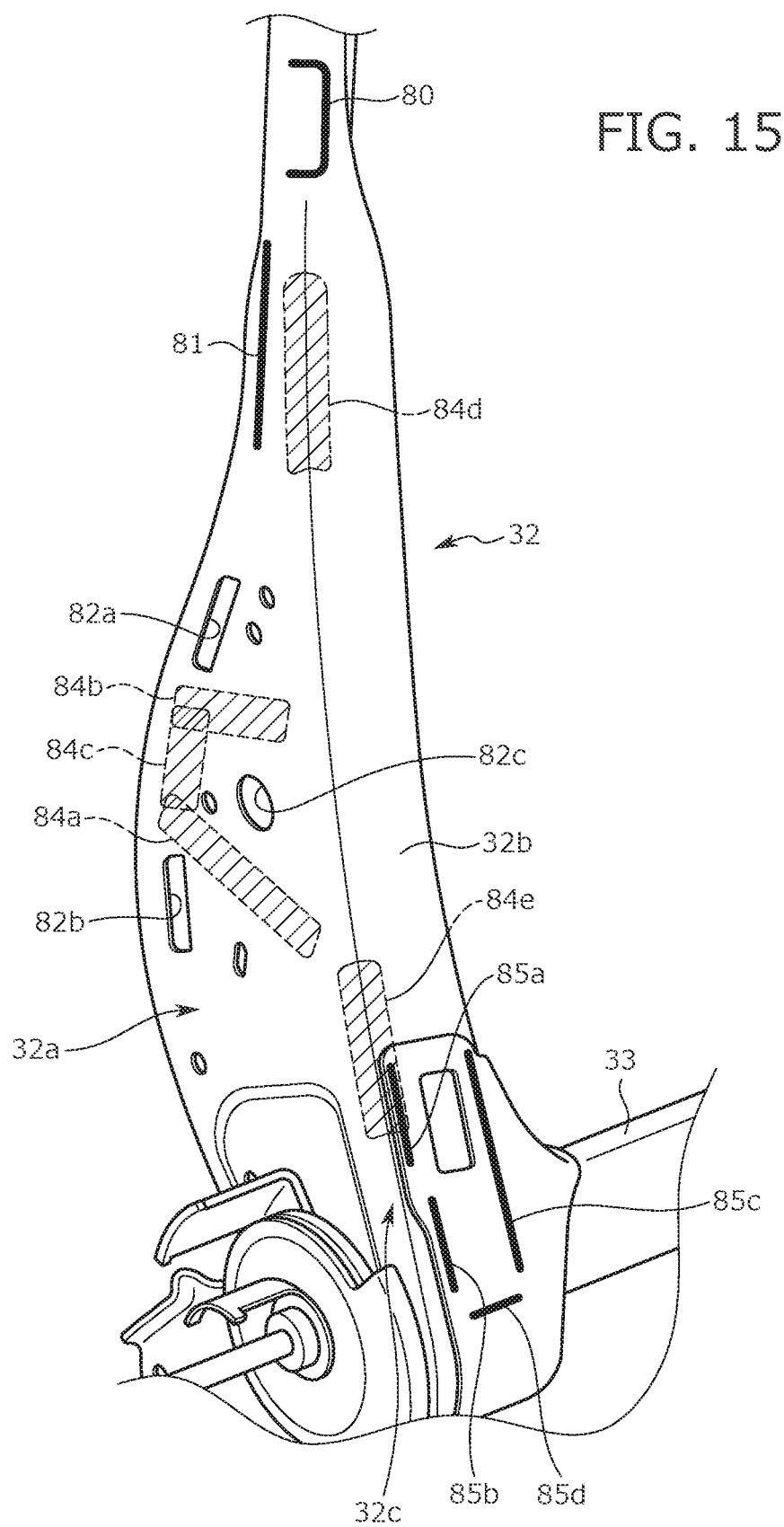
FIG. 15 is a perspective view from a view point XV indicated by an arrow of FIG. 12.

Further, as illustrated in FIG. 15, each side frame 32 of the vehicle seat frame F1 is joined to the lower frame 33 at a welding portion 85a, a welding portion 85b, a welding portion 85c, and a welding portion 85d. Note that an example where laser welding is used as welding of the upper frame 31, the side frames 32, and the lower frame 33 in the vehicle seat frame F1 is illustrated, but other welding methods such as arc welding may be used.

In addition, each side frame 32 of the vehicle seat frame F1 is, as in the vehicle seat frame F, provided with the airbag attachment hole 82a, the airbag attachment hole 82b, and the through-hole 82c as the holes for attachment of the airbag unit (not shown). The airbag unit includes, for example, the airbag body, the webbing configured to guide the expansion direction of the airbag, and the plate for attachment of the airbag. For example, the airbag attachment hole 82a and the airbag attachment hole 82b are the portions to which the webbing of the airbag is attached, and the through-hole 82c is the portion into which the bolt extending from the module of the airbag is inserted.

Next, the thermal treatment portion of the vehicle seat frame F1 is described with reference to FIGS. 13 to 15.

Figure 14:
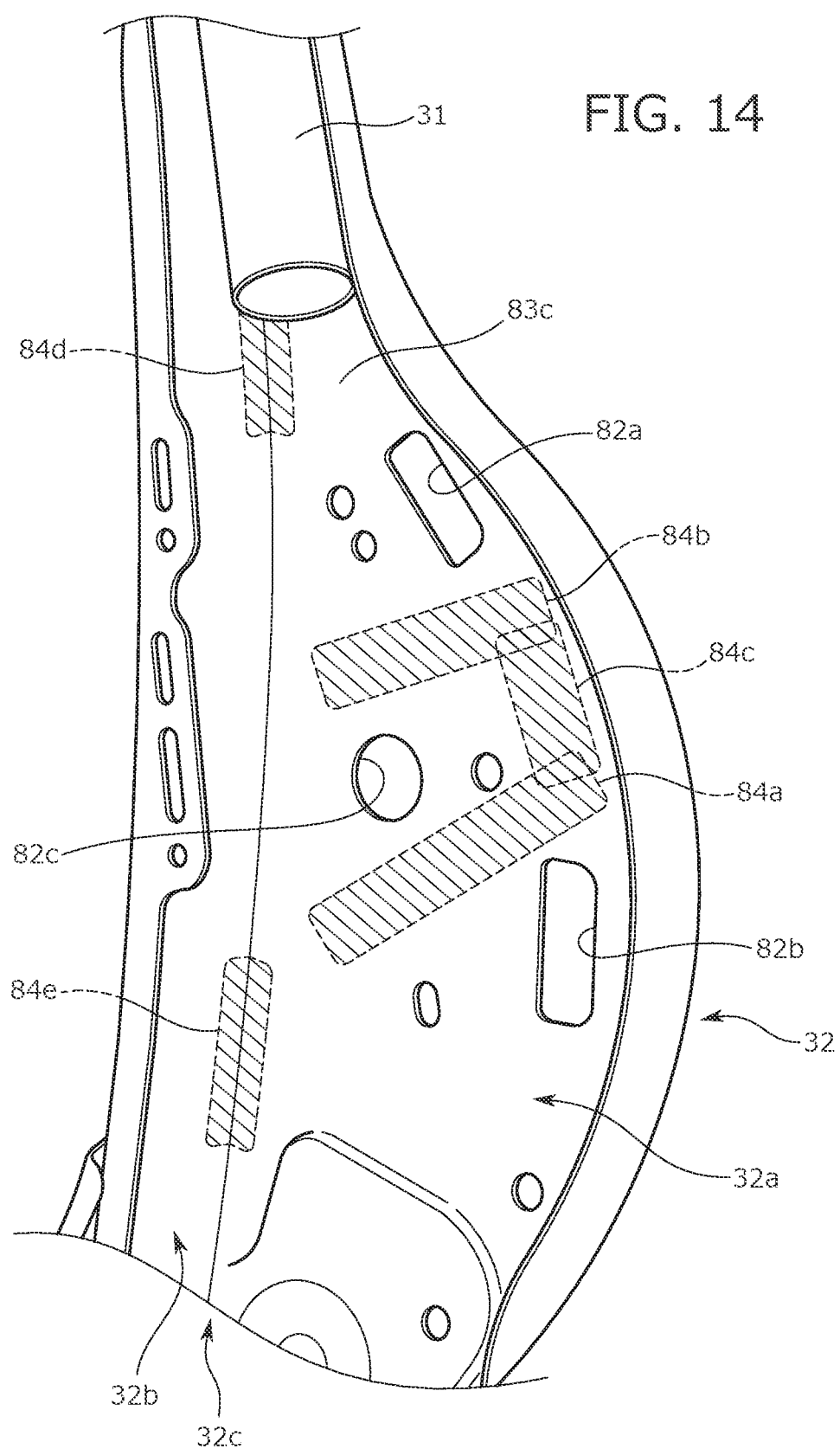
FIG. 14 is a perspective view from a view point XIV indicated by an arrow of FIG. 12.

As illustrated in FIGS. 13 to 15, quenching for strength improvement is, for the vehicle seat frame F1, performed along a connection portion 32c as a ridge portion connecting a seat side surface 32a and a seat back surface 32b of the side frame 32, and in this manner, a high strength portion 84d and a high strength portion 84e (equivalent to a first region) are formed. The high strength portion 84d described herein is formed at a position facing the welding portion 81 at an upper portion of the connection portion 32c. For example, the high strength portion 84d is formed above the airbag attachment hole 82a. Moreover, the high strength portion 84e is, at a lower portion of the connection portion 32c, formed at a position at least partially overlapping with the welding portion 85a. For example, the high strength portion 84e is formed below the airbag attachment hole 82b. As described above, the side frame 32 has the high strength portion 84*d* and the high strength portion 84*e*, and therefore, the strength of the side frame 32 against force applied to the seat back side can be improved. Note that in the vehicle seat frame F1, the high strength portion 84*d* and the high strength portion 84*e* are formed separately from each other, but may be connected as one.

Further, in the vehicle seat frame F1, quenching for strength improvement is performed for a region extending from the vicinity of a high strength portion 84*c* toward the seat front side between the airbag attachment hole 82*b* and the through-hole 82*c*, and in this manner, a high strength portion 84*a* (equivalent to a second region) is formed. In addition, in the vehicle seat frame F1, quenching for strength improvement is performed for a region extending from the vicinity of the high strength portion 84*c* toward the seat front side between the airbag attachment hole 82*a* and the through-hole 82*c*, and in this manner, the high strength portion 84*b* (equivalent to a second region) is formed. As described above, the high strength portion 84*a* and the high strength portion 84*b* are formed at the side frame 32, and therefore, the strength of the side frame 32 against force applied in the seat front-to-back direction can be improved. This can reduce deformation of the side frame 32.

Moreover, quenching for strength improvement is performed for a region (a third region) connecting seat-front-side end portions of the high strength portion 84*a* and the high strength portion 84*b* together, and in this manner, the high strength portion 84*c* is formed. Quenching is performed in different directions as described above, and therefore, the strength can be improved with a proper balance across a wide area of the seat side surface 32*a* of the side frame 32. Note that in the vehicle seat frame F, the bead portion 83 is provided on the front side of the through-hole 82*c*, and therefore, stiffness is enhanced at the periphery of the through-hole 82*c*. On the other hand, in the vehicle seat frame F1, the substantially U-shaped quenched portion including the high strength portion 84*a*, the high strength portion 84*b*, and the high strength portion 84*c* is provided on the front side of the through-hole 82*c*, and therefore, the stiffness can be enhanced at the periphery of the through-hole 82*c* as in the bead portion 83.

In the vehicle seat frame F1, the seat side surface 32*a* of each side frame 32 is reinforced by the high strength portion 84*a*, the high strength portion 84*b*, the high strength portion 84*c*, the high strength portion 84*d*, and the high strength portion 84*e*, and therefore, the strength can be improved across a wide area of the seat side surface 32*a*.

Moreover, in an example illustrated in FIGS. 13 to 15, the high strength portion 84*a* and the high strength portion 84*b* are formed at positions separated from the high strength portion 84*e* and the high strength portion 84*d*. Note that the high strength portion 84*a* and the high strength portion 84*e* may be coupled together, and the high strength portion 84*b* and the high strength portion 84*d* may be coupled together.

Further, in the vehicle seat frame F1, the high strength portion 84*d* is formed along (e.g., substantially in parallel to) the welding portion 81, and the high strength portion 84*e* is formed overlapping with the welding portion 85*a* extending in the seat upper-to-lower direction. The high strength portion 84*d* and the high strength portion 84*e* along the connection portion 32*c* are formed as described above, and therefore, the strength can be improved across a wide area from an upper portion to a lower portion of each side frame 32.

In addition, in the vehicle seat frame F1, the high strength portion 84*d* is provided at a portion where the side frame 32 and the upper frame 31 overlap with each other. Thus, the strength of the joint portion between the upper frame 31 and the side frame 32 can be improved.

In the above-described embodiments, the vehicle seat used for an automobile has been described as a specific example, but the present disclosure is not limited to such a vehicle seat. The present disclosure is also applicable not only to vehicle seats for trains, buses, etc., but also to conveyance seats for airplanes, ships, etc.

Moreover, in the above-described embodiments, e.g., a steel plate with a tensile strength of equal to or higher than 340 MPa may be used as the high tensile strength steel plate, but a specification of the high tensile strength steel plate is not limited to the above examples.

In the present embodiments, the vehicle seat frame of the present disclosure has been mainly described. Note that the above-described embodiments have been set forth as examples for the sake of easy understanding of the present disclosure, and are not intended to limit the present disclosure. Changes and modifications can be made to the present disclosure without departing from the gist of the present disclosure, and needless to say, the present disclosure includes equivalents thereof.

REFERENCE SIGNS LIST

1: seat cushion
1*a*, 2*a*: cushion pad
1*b*, 2*b*: skin material
2: seat back
10: cushion frame
11: cushion side frame
12: pan frame
13: back coupling frame
14, 34: elastic spring
20: reclining mechanism
21: height link mechanism
30: seat back frame
31: upper frame
32: side frame
32*a*: seat side surface
32*b*: seat back surface
32*c*: connection portion
33: lower frame
35: coupling shaft
36: upper cross frame
40: rail mechanism
41: lower rail
42: upper rail
45: rail coupling bracket
50: coupling bracket, connection portion
51: shaft insertion hole
52, 53: bolt fastening hole
61, 61*a*, 71, 120: high strength portion
low strength portion, first low strength portion
72: low strength portion, second low strength portion
  73: low strength portion, third low strength portion
60*a*, 60*b*, 60*c*, 70, 110*a*, 110*b*, 110*c*: welding portion
80: welding portion
81: welding portion
82*a*: airbag attachment hole
82*b*: airbag attachment hole
82*c*: through-hole
83: bead portion
84*a*: high strength portion (second region)
84*b*: high strength portion (second region)
84*c*: high strength portion (third region)
84*d*: high strength portion (first region)

84e: high strength portion (first region)
85a: welding portion
85b: welding portion
85c: welding portion
85d: welding portion
100: rear back frame
101, 102, 103: framework frame
103a, 103b: flange portion
103c: recessed portion
105: rear pan frame
C1, C2, C3: cooling curve
F: vehicle seat frame
F1: vehicle seat frame
S: vehicle seat

What is claimed is:

1. A vehicle seat frame comprising:
a frame member of the vehicle seat frame, the frame member being molded from a high tensile strength steel plate,
wherein the frame member includes:
a non-thermal-treatment portion to which a thermal treatment for strength adjustment is not performed;
a high strength portion having a higher strength than the non-thermal-treatment portion, the high strength portion being a portion to which a thermal treatment for strength improvement is performed; and
a low strength portion having a lower strength than the non-thermal-treatment portion, the low strength portion being a portion to which a thermal treatment for strength reduction is performed,
the vehicle seat frame comprises:
a seat back frame that includes a side frame;
a seat cushion frame; and
a connection portion between the seat back frame and the seat cushion frame, the connection portion has:
a shaft insertion hole for a coupling shaft of the vehicle seat frame; and
a bolt fastening hole for a bolt for fastening the seat cushion frame and the connection portion,
the frame member includes the side frame of the seat back frame and the connection portion,
the low strength portion includes a first low strength portion that is provided between the shaft insertion hole and the bolt fastening hole at the connection portion, and
the high strength portion is provided along a connection portion between a seat side surface and a seat back surface of the side frame.

2. The vehicle seat frame according to claim 1, wherein the high strength portion is a portion heated to a temperature equal to or higher than a predetermined temperature and then cooled at a cooling rate equal to or higher than a predetermined cooling rate.

3. The vehicle seat frame according to claim 1, wherein a metal structure of the high strength portion includes martensite.

4. The vehicle seat frame according to claim 1, wherein the low strength portion is a portion heated to a temperature equal to or higher than a predetermined temperature and then cooled at a cooling rate lower than a predetermined cooling rate.

5. The vehicle seat frame according to claim 1, wherein a metal structure of the low strength portion includes pearlite.

6. The vehicle seat frame according to claim 1, wherein the low strength portion includes a second low strength portion that is provided at a lower portion of the side frame forming the seat back frame.

7. The vehicle seat frame according to claim 1, wherein the side frame of the seat back frame is provided with a plurality of holes for airbag attachment, and
the high strength portion is provided between the plurality of holes and extends in a seat front-to-back direction.

8. The vehicle seat frame according to claim 7, wherein the high strength portion has
a plurality of regions that are provided between the plurality of holes and extend in the seat front-to-back direction.

9. The vehicle seat frame according to claim 1, wherein the frame member further includes an upper frame that forms a seat back frame of the vehicle seat frame, and
the high strength portion is provided at a portion where the upper frame of the seat back frame and the side frame of the seat back frame overlap with each other.

10. The vehicle seat frame according to claim 1, wherein the frame member further includes the seat cushion frame, and
the low strength portion includes a third low strength portion that is provided at a back portion of a cushion side frame forming the seat cushion frame.

11. A method for manufacturing a vehicle seat frame, wherein the vehicle seat comprises a frame member of the vehicle seat frame, the frame member being molded from a high tensile strength steel plate, and wherein the frame member includes: i) a non-thermal-treatment portion to which a thermal treatment for strength adjustment is not performed; ii) a high strength portion having a higher strength than the non-thermal-treatment portion, the high strength portion being a portion to which a thermal treatment for strength improvement is performed; and iii) a low strength portion having a lower strength than the non-thermal-treatment portion, the low strength portion being a portion to which a thermal treatment for strength reduction is performed, the method comprising:
assembling frame members into the vehicle seat;
forming the high strength portion by performing a thermal treatment to the frame member for strength improvement to change metal structure of the frame member; and
forming the low strength portion by performing a thermal treatment to a different portion of the frame member than the high strength portion for strength reduction to change metal structure of the frame member,
wherein performing the thermal treatment for strength improvement and performing the thermal treatment for strength reduction are performed after assembling the frame members into the vehicle seat.

12. The method for manufacturing a vehicle seat frame according to claim 11, wherein
performing the thermal treatment for strength improvement includes cooling the frame member at a cooling rate equal to or higher than a predetermined cooling rate after heating the frame member to a temperature equal to or higher than a predetermined temperature.

13. The method for manufacturing a vehicle seat frame according to claim 11, wherein
performing the thermal treatment for strength improvement includes controlling a cooling rate such that the metal structure of a thermal treatment portion is transformed into martensite.

14. The method for manufacturing a vehicle seat frame according to claim 11, wherein
performing the thermal treatment for strength reduction includes cooling the frame member at a cooling rate lower than a predetermined cooling rate after heating the frame member to a temperature equal to or higher than a predetermined temperature.

15. The method for manufacturing a vehicle seat frame according to claim 11, wherein
performing the thermal treatment for strength reduction includes controlling a cooling rate such that the metal structure of a thermal treatment portion is transformed into pearlite.

16. A vehicle seat frame comprising:
a frame member of the vehicle seat frame, the frame member being molded from a high tensile strength steel plate,
wherein
the frame member includes:
a non-thermal-treatment portion to which a thermal treatment for strength adjustment is not performed;
a high strength portion having a higher strength than the non-thermal-treatment portion, the high strength portion being a portion to which a thermal treatment for strength improvement is performed; and
a low strength portion having a lower strength than the non-thermal-treatment portion, the low strength portion being a portion to which a thermal treatment for strength reduction is performed,
the frame member is a side frame that forms a seat back frame of the vehicle seat frame,
the side frame of the seat back frame is provided with a plurality of holes for airbag attachment, and
the high strength portion is provided between the plurality of holes and extends in a seat front-to-back direction.

* * * * *